(12) United States Patent
Vengalayapalli Kichagari

(10) Patent No.: US 11,551,104 B2
(45) Date of Patent: Jan. 10, 2023

(54) METHOD AND SYSTEM FOR EXCHANGE OF PACKETS PERTAINING TO AN INSTRUMENT

(71) Applicant: DK2 TECHNOLOGIES INDIA PVT. LTD, Maharashtra (IN)

(72) Inventor: Sudhakar Vengalayapalli Kichagari, Navi Mumbai (IN)

(73) Assignee: D2K TECHNOLOGIES INDIA PVT. LTD, Mahahashtra (IN)

( * ) Notice: Subject to any disclaimer, the term of this patent is extended or adjusted under 35 U.S.C. 154(b) by 410 days.

(21) Appl. No.: 16/633,736

(22) PCT Filed: Jul. 25, 2018

(86) PCT No.: PCT/IB2018/055538
§ 371 (c)(1),
(2) Date: Jan. 24, 2020

(87) PCT Pub. No.: WO2019/021199
PCT Pub. Date: Jan. 31, 2019

(65) Prior Publication Data
US 2020/0210856 A1    Jul. 2, 2020

(30) Foreign Application Priority Data
Jul. 26, 2017   (IN) .............................. 201721026628

(51) Int. Cl.
*G06N 5/02* (2006.01)
*G06F 16/28* (2019.01)
*G06Q 50/26* (2012.01)

(52) U.S. Cl.
CPC ............. *G06N 5/02* (2013.01); *G06F 16/285* (2019.01); *G06Q 50/26* (2013.01)

(58) Field of Classification Search
CPC .. G06N 3/00–20/00; G06F 1/00–40/00; G06Q 10/00–50/00
(Continued)

(56) References Cited

U.S. PATENT DOCUMENTS 6,134,555 A * 10/2000 Chadha ................. G06F 16/285
707/999.102
8,219,507 B2 * 7/2012 Jaros ..................... G06N 20/00
706/12
(Continued)

OTHER PUBLICATIONS

PCT International Search Report and Written Opinion, Application No. PCT/IB2018/055538, International Filing Date Jul. 25, 2018, Search Reporty dated Nov. 26, 2018, 8 pages.

*Primary Examiner* — Alan S Miller
(74) *Attorney, Agent, or Firm* — Patent Law Works LLP; Daniel Morath

(57) ABSTRACT

The present disclosure relates to a method and system for exchanging packets of information pertaining to an instrument. Data pertaining to the instrument is obtained from internal and external sources, which may be governmental or non-governmental. The obtained data undergoes a process of clustering and dimensional reduction to arrive at cleaned and optimised data attributes. A predictive model is built using those data attributes. A testing provision is included in the proposed method and system that allows for validation of the constructed model by using test data and comparing the predictions with actual values. Upon validation, the model predicts one or more packets of information that can have a bearing on the exchange of packets pertaining to the instrument.

5 Claims, 8 Drawing Sheets

(58) Field of Classification Search
USPC .............................. 705/7.11–7.42; 706/1–45
See application file for complete search history.

(56) References Cited

U.S. PATENT DOCUMENTS

| | | | |
|---|---|---|---|
| 8,370,280 B1* | 2/2013 | Lin ......................... | G06N 5/04 706/12 |
| 2003/0200191 A1* | 10/2003 | Pao ..................... | G06K 9/6232 706/62 |
| 2005/0234762 A1* | 10/2005 | Pinto ..................... | G06Q 30/02 700/44 |
| 2006/0206445 A1* | 9/2006 | Andreoli ............... | G06F 3/1204 706/52 |
| 2011/0170777 A1* | 7/2011 | Inagaki ................... | G06F 16/35 382/177 |
| 2011/0196872 A1* | 8/2011 | Sims ................ | G06F 16/90344 707/E17.089 |
| 2014/0136452 A1* | 5/2014 | Wellman ............... | G06N 20/00 706/12 |
| 2015/0058260 A1* | 2/2015 | Mun .................... | G06Q 40/025 705/36 R |
| 2015/0127415 A1* | 5/2015 | Showalter .......... | G06Q 10/0635 705/7.28 |
| 2018/0060744 A1* | 3/2018 | Achin ...................... | G06N 5/04 |
| 2018/0285685 A1* | 10/2018 | Singh ................ | G06F 16/9038 |

* cited by examiner

METHOD AND SYSTEM FOR EXCHANGE OF PACKETS PERTAINING TO AN INSTRUMENT

TECHNICAL FIELD

The present disclosure relates to the exchange of packets of data-based information pertaining to an instrument. In particular, the disclosure relates to packets of information obtained from a predictive model that is built upon available data from networked databanks.

BACKGROUND

Background description includes information that may be useful in understanding the present invention. It is not an admission that any of the information provided herein is prior art or relevant to the presently claimed invention, or that any publication specifically or implicitly referenced is prior art.

Prediction of packets of information for simulating scenarios for assessing exchange of packets pertaining to one or more instruments is highly valuable. However, to have relevance, it is imperative that predictive models designed for such predictions, predict packets that are as close to actual values as possible.

A well designed predictive model predicts packets of information based on data attributes obtained from the parties involved in the exchange of packets pertaining to said instrument. The information predicted holds great value in assessing the nature of exchange of packets pertaining to the instrument, which further determines the state of the instrument.

An exemplary implementation of such a predictive model is to assess the risk in lending credit, between a lending entity and a borrower.

In the domain of Credit Risk practice, classification of exposures largely follows binary approaches, that is, 'Performing' or 'Non-Performing', based on the absence or occurrence of default to the lending entity during the reference period. The preponderance of 'Non-Default' exposures data points in the population does not easily lend itself for predicting potential default in a scientific manner. The binary nature of classification of loan exposure has compelled practitioners to bracket 'Non-Default' exposures into few buckets (8-9), implying that all exposures within a bucket same have the same or similar default tendencies.

The above described approach neither allows for discerning variables influencing actual 'Defaults' within a population nor lends itself for an acceptable back-testing of predicted 'Probability of Defaults' (PD).

There is therefore a need in the art for a predictive model that can predict complex packets of information that fall, preferably, on a continuum scale for better understanding of the complexities involved in the exchange of information packets pertaining to an instrument.

OBJECTS OF THE INVENTION

It is a general object of the present invention to provide a method and system for exchanging packets of information pertaining to an instrument.

It is another object of the present invention to provide a predictive model capable of predicting one or more packets that can influence the exchange of packets pertaining to the instrument.

It is another object of the present invention to provide a predictive model from data acquired from internal and external sources, both governmental and non-governmental, and structured and unstructured data elements.

It is yet another object of the present invention to provide a predictive model that is built after the data attributes have been optimised.

SUMMARY

The present disclosure relates to the exchange of packets of data-based information pertaining to an instrument. In particular, the disclosure relates to packets of information obtained from a predictive model that is built upon available data from networked databanks.

The present disclosure discloses a method and system for exchanging packets of information pertaining to an instrument. In particular, a method and system are disclosed to predict one or more packets of information using a predictive model, wherein the one or more packets of information have an influence over the exchange of the packets of information pertaining to the instrument.

In an aspect, the method is disclosed for exchanging packets pertaining to an instrument, said method comprising the steps of: filtering insignificant variables, clustering instrument transaction data; reducing the dimension of data clusters; and predicting one or more packets using a predictive model.

In another aspect, the proposed method involves filtering out the insignificant attributes and clustering them into one or more clusters, based on similarity of information contained in attributes of the response variable.

In another aspect, the proposed method involves reducing the dimension of variables within a cluster and converting reduced variables within the cluster into new set of uncorrelated variables of the same number as the reduced variables, called components.

In another aspect, the proposed method involves predicting one or more packets that can influence the exchange of packets pertaining to said instrument, using a predictive model, wherein said predictive model is built from data from the one or more filtered clusters and the components and said predictive model is built after the formation of said filtered clusters and components.

In another aspect, the external data attributes can be obtained from external governmental and non-governmental sources as structured and unstructured data.

In another aspect, the instrument transaction data and any or a combination of one or more external and internal data attributes are merged and converted to variables, before the processes of insignificant variable filtration and clustering.

In another aspect, predicted default probabilities are transformed to variables such that the default distribution is normalised across each individual sector of origin.

In another aspect, a back-testing process is carried out to verify the predictive capability of the model, by utilising test data.

In another aspect, a system is disclosed for exchanging packets pertaining to an instrument, said system comprising: non-transitory storage device; and one or more processors coupled to the non-transitory storage device and operable to execute the one or more routines, wherein the one or more routines include: a data unit, which when executed by the one or more processors, retrieves and collates instrument transaction data and any or a combination of one or more external and internal data attributes; a clustering unit, which when executed by the one or more processors, clusters the data variables based on similarity of information; a dimension reduction unit, which when executed by the one or more processors, reduces the dimension of the clusters; a modelling unit, which when executed by the one or more processors, builds a predictive model; a testing unit, which when executed by the one or more processors, tests the predictive capability of said predictive model; and a prediction unit, which when executed by the one or more processors, predicts one or more packets.

In another aspect, the data unit, retrieves and collates instrument transaction data and any or a combination of one or more external and internal data attributes, and merges said data and data attributes and converts them to variables.

In another aspect, the variables containing insignificant information about the response are filtered out from further process, then the clustering unit clusters the data variables based on similarity of information.

In another aspect, the dimension reduction unit reduces the dimension of the clusters by transforming the clusters into a set of variables, called components.

In another aspect, the modelling unit builds a predictive model to predict packets that can influence the exchange of packets pertaining to said instrument, based on the clusters and components obtained.

In another aspect, the testing unit tests the predictive capability of said predictive model.

In another aspect, the prediction unit predicts one or more packets that can influence the exchange of packets pertaining to said instrument.

In another aspect, the external data attributes can be obtained from one or more networked databanks configured to receive and store information from external sources. In another aspect, other sources of data can include devices or instruments that record real time information of surroundings and entities.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

The accompanying drawings are included to provide a further understanding of the present disclosure and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure, and wherein.

DETAILED DESCRIPTION

Figure 1:
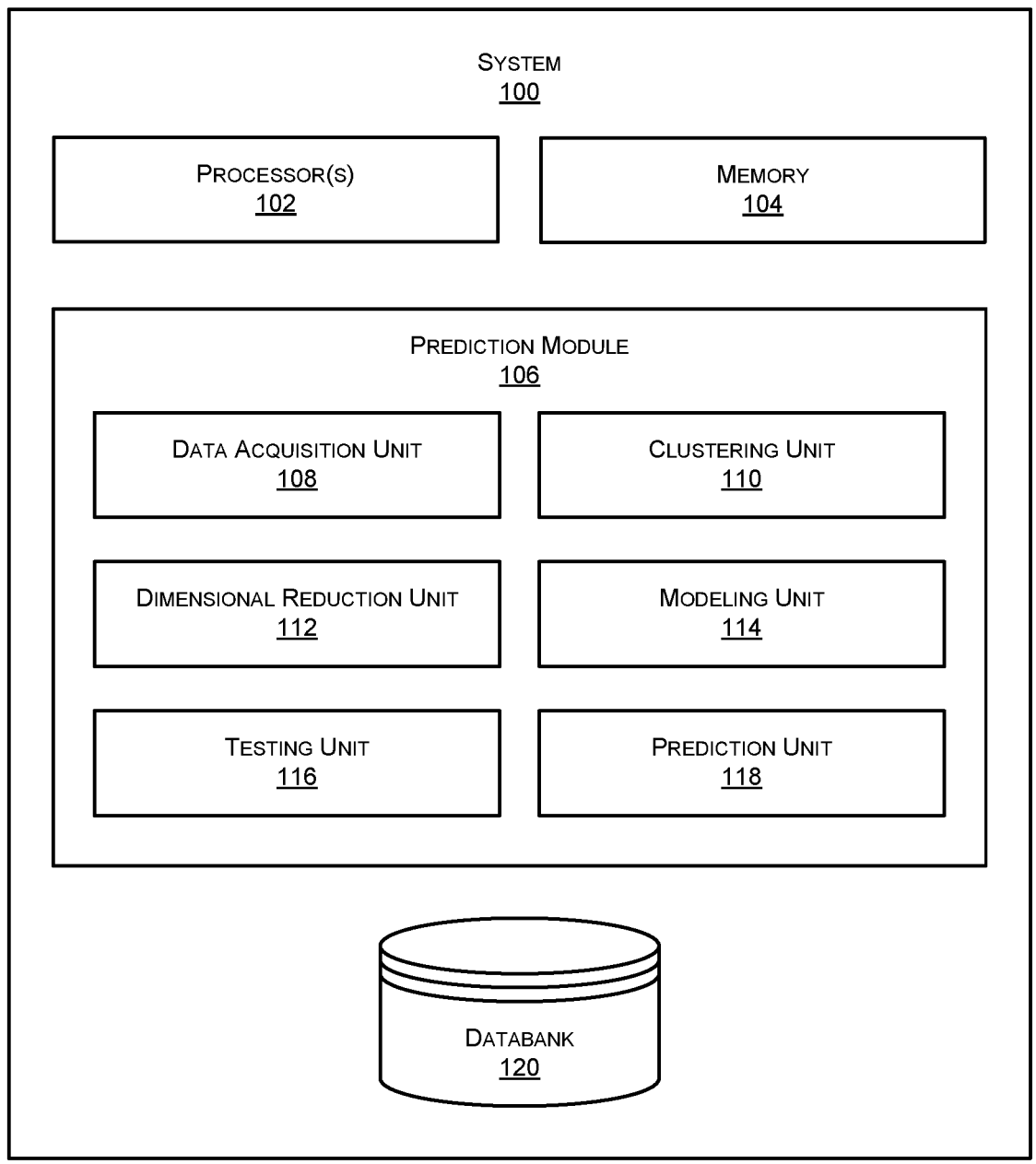
FIG. 1 illustrates a system diagram for exchanging packets pertaining to an instrument.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

Embodiments explained herein generally relate to the exchange of packets of information pertaining to an instrument. In particular, the disclosure relates to packets of information obtained from a predictive model that is built upon available data from networked databanks.

In an embodiment, a method and system are disclosed for exchanging packets of information pertaining to an instrument. In particular, a method and system are disclosed to predict one or more packets of information using a predictive model, wherein the one or more packets of information have an influence over the exchange of the packets of information pertaining to the instrument.

In an aspect, the method is disclosed for exchanging packets pertaining to an instrument, said method comprising the steps of: filtering insignificant variables, clustering instrument transaction data; reducing the dimension of data clusters; and predicting one or more packets using a predictive model.

In another aspect, the proposed method involves filtering out the insignificant attributes and clustering them into one or more clusters, based on similarity of information contained in attributes of the response variable.

In another aspect, the proposed method involves reducing the dimension of the one or more clusters, by transforming the attributes in said cluster to a new set of variables, called components, where the components are uncorrelated with each other.

In another aspect, the proposed method involves predicting one or more packets that can influence the exchange of packets pertaining to said instrument, using a predictive model, wherein said predictive model is built from data from the one or more filtered clusters and the components and said predictive model is built after the formation of said filtered clusters and components.

In another aspect, wherein the external data attributes can be obtained from external governmental and non-governmental sources in structured and unstructured form.

In another aspect, the instrument transaction data and any or a combination of one or more external and internal data attributes are merged and converted to variables, before the clustering process.

In another aspect, the predicted default probabilities are transformed to variables such that the default distribution is normalised across each individual sector of origin.

In another aspect, a back-testing process is carried out to verify the predictive capability of the model, by utilising test data.

In another aspect, a system is disclosed for exchanging packets pertaining to an instrument, said system comprising: non-transitory storage device; and one or more processors coupled to the non-transitory storage device and operable to execute the one or more routines, wherein the one or more routines include: a data unit, which when executed by the one or more processors, retrieves and collates instrument transaction data and any or a combination of one or more external and internal data attributes; a clustering unit, which when executed by the one or more processors, clusters the data variables based on similarity of information; a dimension reduction unit, which when executed by the one or more processors, reduces the dimension of the clusters; a modelling unit, which when executed by the one or more processors, builds a predictive model; a testing unit, which when executed by the one or more processors, tests the predictive capability of said predictive model; and a prediction unit, which when executed by the one or more processors, predicts one or more packets.

In another aspect, the data unit, retrieves and collates instrument transaction data and any or a combination of one or more external and internal data attributes, and merges said data and data attributes and converts them to variables.

In another aspect, the insignificant attributes are filtered out and the remaining variables are clustered into one or more clusters based on similarity of information.

In another aspect, the dimension reduction unit reduces the dimension of the clusters by transforming the clusters into a set of variables, called components.

In another aspect, the modelling unit builds a predictive model to predict one or more packets that can influence the exchange of packets pertaining to said instrument, based on the clusters and components obtained.

In another aspect, the testing unit tests the predictive capability of said predictive model.

In another aspect, the prediction unit predicts one or more packets that can influence the exchange of packets pertaining to said instrument.

In another aspect, the external data attributes can be obtained from one or more networked databanks configured to receive and store information from external sources. In another aspect, other sources of data can include devices or instruments that record real time information of surroundings and entities.

FIG. 1 illustrates a system diagram for exchanging packets pertaining to an instrument. In an embodiment, said system 100 comprises: a data acquisition unit 108; a clustering unit 110; a dimensional reduction unit 112; a modelling unit; a testing unit; and a prediction unit 118.

In another aspect, one or more processors 102 are provided in the system 100 to execute the units as detailed above. Also provided is a cache memory 104 to store transitory information during processing of various units as detailed above.

In another aspect, the databank 120 can be a networked repository of public information that is tapped into by the data acquisition unit 108 (hereinafter referred to as "data unit") for forming a predictive model. In another aspect, said public information can be any or a combination of structured and unstructured governmental and non-governmental.

In an embodiment, the data unit 108 retrieves data from databank 120 that pertains to the exchange of packets for an instrument. Said data can be internal or external, wherein internal data includes data pertaining to the institutions engaged in exchanging the packets of information pertaining to aforementioned instrument; and the external data is information that can influence the exchange of packets that is exclusive of the internal data. In another embodiment, said external data can be acquired manually or automatically through one or more routine run on the processors.

In another embodiment, the data unit 108 cleanses the internal data by transforming it into a form that can be processed by the proposed predictive model. In another aspect, the external data is in the form that can be processed by said predictive model. In another embodiment, one or more routines can be run on the processors to perform said cleansing, so as to render said process automatic.

In another embodiment, the clustering unit 110 merges the cleansed internal data and the external data and said merged data attributes are transformed into variables. A further processing step of variable conversion is performed on said variables, wherein variables are slotted into categories based on different parameters such that they can be utilised by the proposed predictive model for more accurate predictions.

In another aspect, certain data attributes from the merged list that are in a continuous manner or are already categorised can be converted into variables in a manner that can be effectively utilised by the proposed model to provide more accurate packets of information.

In another embodiment, for each category of variables, a score is assigned to each of said variables based on the history for the respective category pertaining to a packet of information relevant to the instrument. Further, based on importance or significance of said category or variable to said packet of information, weightage points can be assigned to the respective category or variable.

In another aspect, the abovementioned variables are further refined by removing variables that do not possess significant information about abovementioned packet of information, in a process referred to as insignificant data filtration.

In another aspect the abovementioned variables are further tested for independence, wherein variables that provide same or similar information are clustered together, such that correlation between variables in the same cluster is high, while correlation of variables of different clusters is low.

In an embodiment, the abovementioned processes of insignificant data filtering and checking for independence is collectively referred to as "Hierarchical Clustering".

In another embodiment, the dimensional reduction unit 112 reduces dimension of the clusters formed by the clustering unit 110 by transforming the variables within each cluster into a new set of variables, referred to as "components", that are uncorrelated with one another. The process mentioned can be carried out for each cluster containing more than one variable.

In an exemplary embodiment, the components can be a linear combination of other variables from the same cluster, arrived at by using methods such as principal component analysis ("PCA").

In another embodiment, the modelling unit 114 builds a predictive model based on the components obtained from the dimensional reduction unit 112 that can predict one or more packets of information that would influence the overall exchange of packets of information pertaining to the instrument.

In another embodiment, the modelling unit 114 divides the data received from the dimension reduction unit 112 randomly into two groups—testing data and training data. The training data is utilised in building the proposed model, wherein a stepwise variable selection process is carried out to filter out variables that have been rendered redundant due to the presence of other similar variables at any step.

In an aspect, the stepwise variable selection process results in a subset of variables from a larger set that would result in a predictive model with good predictability. Said model can be used to predict one or more packets of information that can influence the exchange of packets of information pertaining to the instrument.

In an embodiment, the modelling unit 114 is also configured to check if the data variables are formatted in accordance with the system requirement. This checking is referred to as "model validation" and appropriate actions are taken, based on the outcome of said model validation. The appropriate actions can include any or a combination of processes of the clustering unit 110 and dimensional reduction unit 112. In case of the presence of outlying observations in the model data, the proposed model is rebuilt by removing said outlying observations.

In another embodiment, the modelling unit 114 is further configured to check whether the independent variables that are in the model are correlated. In case of high correlation between independent variables, the processes of the dimensional reduction unit 112 are repeated on the independent variable set in order that issues arising from interdependency of variables does not arise.

In another embodiment, the testing unit 116 determines the predictive capability of the proposed model, by using the testing data obtained from the dimensional reduction unit 112 to make predictions. Said predictions are evaluated against actual values and appropriate changes are made to the model to bring it closer to congruency with actuality.

In another embodiment, the prediction unit 118, if the proposed model is valid, performs a prediction and the results are one or more packets of information that can influence the exchange of packets of information pertaining to the instrument.

Figure 2:
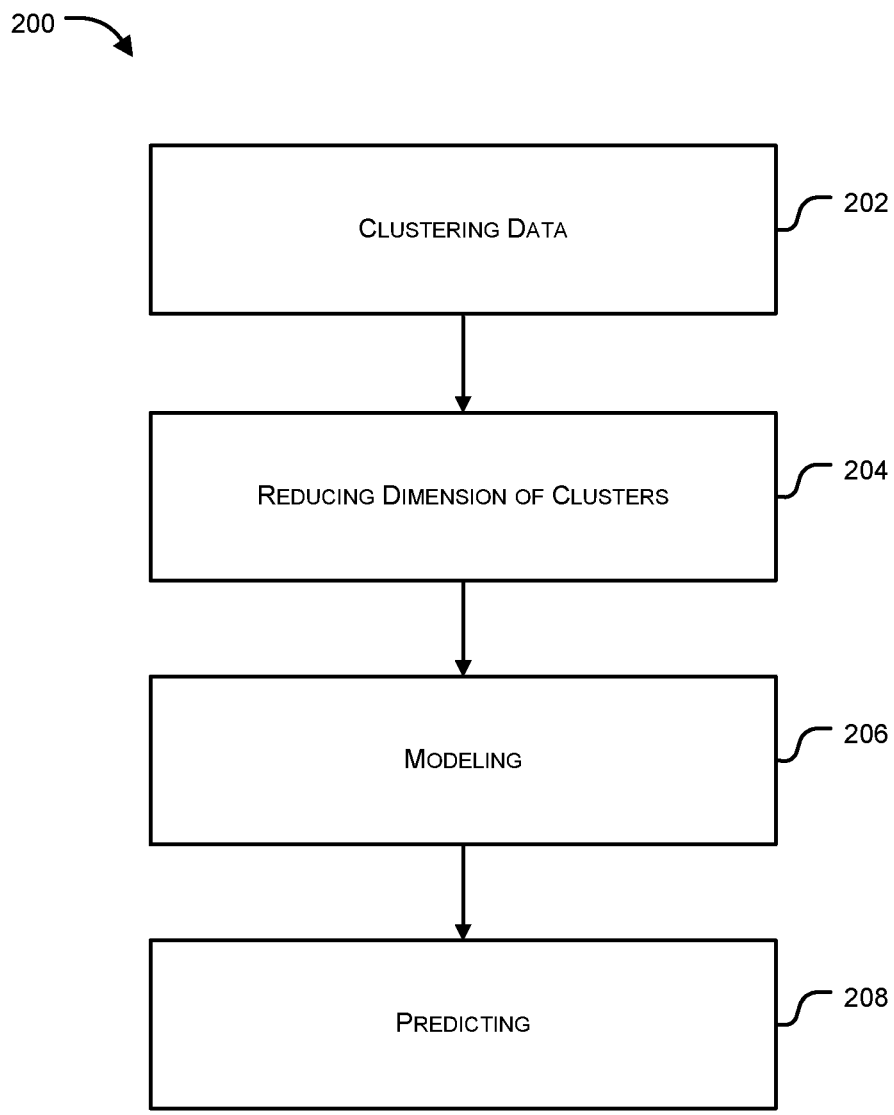
FIG. 2 illustrates a flow diagram for a method to determine exchange of packets pertaining to an instrument.

FIG. 2 illustrates a flow diagram for a method to determine exchange of packets pertaining to an instrument. In an embodiment, said method 200 comprises steps of: data clustering 202; dimension reduction 204; predictive modelling 206; and result analysis 208.

In an embodiment, in step 202, internal and external data attributes are merged and transformed into variables, and the variables are further slotted into categories. Further, for each category of variables, a score is assigned based on the history of the respective category pertaining to a packet of information relevant to the instrument. Additionally, weightage points are also assigned to the categories or variables.

In another embodiment, the aforementioned variables are refined by filtering out data that does not possess a significant quantum of information about the packet of information relevant to the instrument.

In another embodiment, the abovementioned variables are clustered together such that variables that provide similar or the same information form part of the same cluster.

In an embodiment, in step 204, the dimensions of the clusters obtained from step 202 are reduced by transforming the variables from each cluster into a new set of uncorrelated variables called components.

In an embodiment, in step 206, the components from step 204 are divided randomly into a training data group and a testing data group. A stepwise variable selection process is carried out on the training data group to filter out variables that, due to presence of similar variables at a given step, have become redundant, and this filtered data group is utilised to build the proposed predictive model.

In another embodiment, step 206 further carries out model validation by checking if the data variables are formatted in accordance with the system requirements. If it is determined that they are not, any or a combination of steps 202 and 204 are repeated.

In another embodiment, in step 206, the proposed predictive model is constructed based on the components obtained from step 204, said model being able to predict one or more packets of information that can influence the exchange of packets of information pertaining to the instrument.

In another embodiment, step 206 further checks for independency of data variables in the model to ensure that the variables are not correlated. This is done to avoid any issues arising from interdependency of the variables. In case of a correlation, step 204 is repeated.

In another embodiment, the predictive capability of the model is tested by using the testing data obtained from step 204 to make predictions. These predictions are evaluated against actual values and appropriate changes are made to the model to bring it closer to actuality.

In another embodiment, in step 208, the proposed model, if found valid, predicts one or more packets of information that can influence the exchange of packets of information pertaining to the instrument.

Working Example

In an exemplary implementation, the proposed method and system can be applied to determine the probability of default ("PD") of a loan credit, during the tenure of said loan. The proposed method and system can also be utilised to calculate loss given default ("LGD"), defined as the loss a lending entity would accrue in case of a default.

In an embodiment, the proposed method and system can be utilised to define default of an exposure from a reference default point, and assign arithmetic values ranging between 0 & 1 in, for instance, 16 decimal places for each exposure, thereby giving distinct default probability ranking within the population.

In another embodiment, the proposed method and system can be utilised to factor or take into account various internal and/or external variables that are statistically significant and are independent for usage in statistical models/machine learning algorithms, so as to arrive at numeric value of PD of an individual exposure.

In another embodiment, the proposed method and system can be utilised to enable evaluation of possible default and possible recovery with a high confidence level based on computation of PD for one year and/or for the complete loan tenure.

In another embodiment, the proposed method and system can be further utilised to determine LGD, economic capital required against unexpected losses ("K"), and Expected Credit Losses ("ECL"), exposure wise.

In another embodiment, PD calculation can be based on machine learning techniques selected from any or a combination of the techniques including and not limited to Logistic Regression, Random Forest, Neural Network, Decision Tree, etc. In another aspect, the dependent variable used in model is:

Default=1 if exposure defaults at any instance during next one year or during loan tenure; and Default=0 if exposure status remains standard or non-default during next one year.

In another embodiment, the proposed method and system can be implemented as a part of one or more risk profiling models that consider one or more factors along with historical performance patterns in the loan portfolio, in conjunction with external factors derived from structured & unstructured (free text) data on various parameters leading to identifiable risk factors for inclusion in statistical modelling processes. The risk profiling models are sensitive to dynamics of financial and economic aspects along with exposure to specific attributes including but not limited to tenure, limit, size, geography sector, activity, interest rate, repayment schedule, changes in duties, production, revenue, profit, margin, ban on product/factory, calamities etc.

Figure 3:
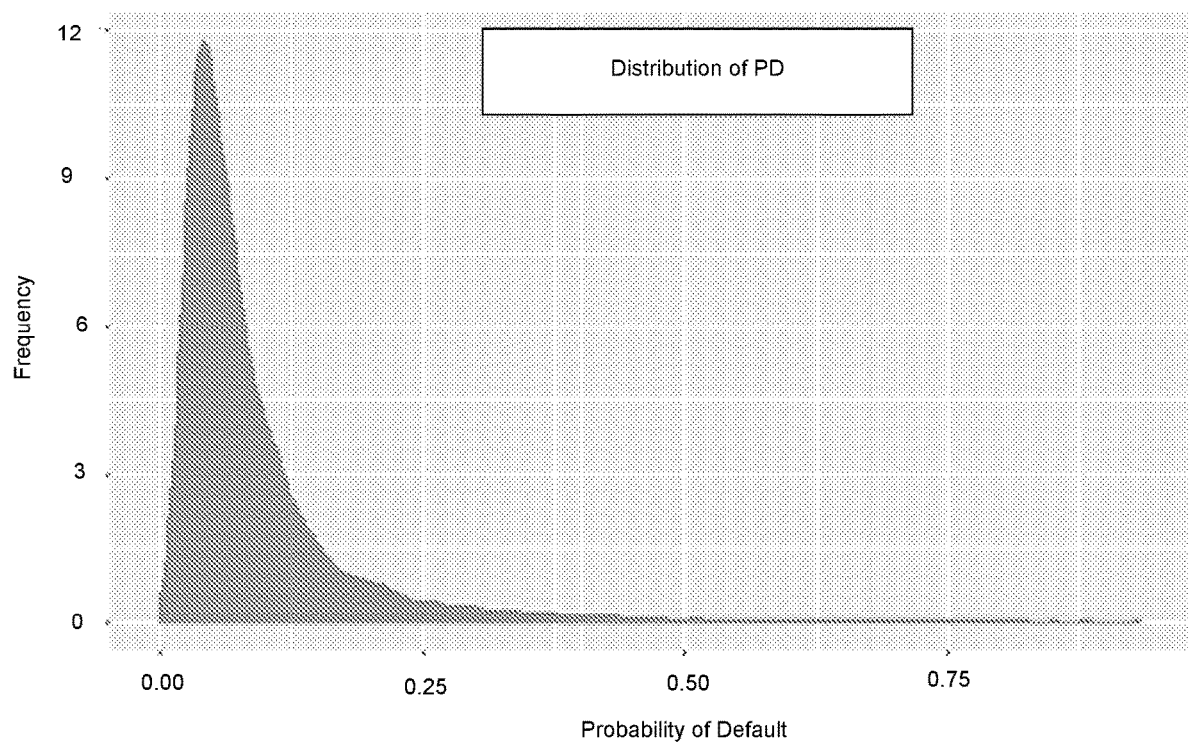
FIG. 3 illustrates a typical, conventional representation of PD distribution, as seen in the art.

FIG. 3 illustrates a conventional representation of PD distribution, where, as can be seen, PD has right skewed distribution with fat tail and, due to this skewed distribution, comparison between different sectors/models is a complicated task. In another embodiment, the proposed method and system overcomes this drawback, wherein the PD can be transformed in order to express it into a bell-shaped distribution (Normal Distribution), which solves the problem of comparison of PD between different sectors/models.

D2D Computation

Figure 4:
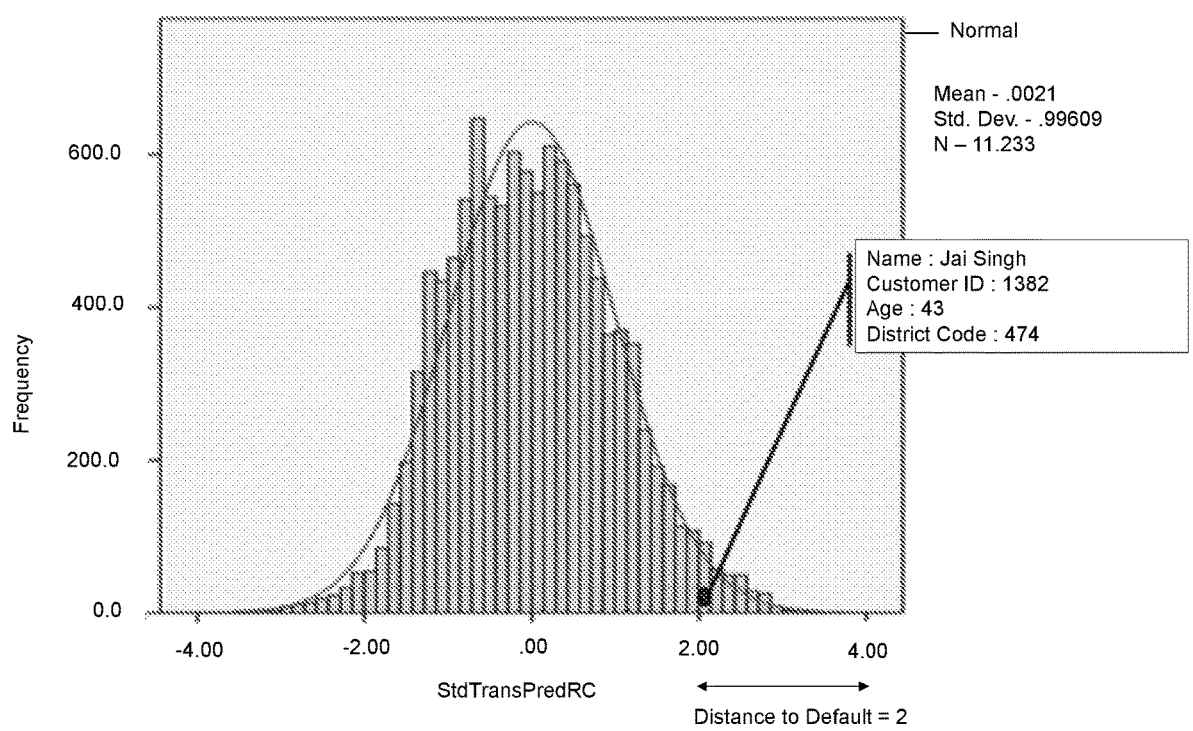
FIG. 4 illustrates the representation of computed Distance to Default (D2D) that leads to expressing the credit distribution in a normal distribution.

FIG. 4 illustrates the representation of computed Distance to Default that leads to expressing the credit distribution in a normal distribution.

In an embodiment, the proposed method and system can compute Distance of Default ("D2D"), which is the distance between the value of Z-score of transformed PD and 4 (i.e. upper 4 sigma limit). Further, the computed D2D facilitates ranking of exposures with reference of absolute default where PD=1.

In another embodiment, D2D can lie between 0 and 8, and thereby, accounts having Distance to Default close to 0 have high potential to become a non-performing asset ("NPA"). In another embodiment, D2D can be computed as 4−z-score (transformed PD), where, z-score is the standardized value of the transformed PD.

LGD Computation

In an embodiment, the proposed method and system further enables computation of LGD, defined as the amount of loss that a lending entity would accrue in case of a default. In other words, LGD can be defined as the amount of loss that the lending entity would suffer, on default by a borrower.

In another embodiment, exposure specific LGDs can be computed using predicted recovery rates ("RR") and Exposure at Default ("EAD"). The predicted RR incorporates several dynamic variables including but not limited to realizability of underlying securities of secured exposure and unsecured exposures with significant influence, in accurate computation of the same. Said LGD can be computed as:

$$LGD = 1 - Predicted\ Recovery\ Rate\ (RR)$$

In another embodiment, the RR is modelled using historical data and using techniques such as but not limited to regression modelling, machine learning, decision trees and clustering.

In another embodiment, the proposed method and system utilise internal data of credit-lending organisations along with external data, wherein the internal data can include information pertaining to individuals registered in their lending organisation. In another embodiment, internal and external data that can be utilised for prediction of likeliness of defaulting of an individual can include structured data and/or unstructured data. Processing such data can allow the structured data and unstructured data to be organised in a manner that allows the data to be utilised by the proposed system in the prediction of likeliness to default.

In an instance, while calculating LGD, variables such as realization of the security and unsecured portion of the exposure are considered and found important for the accurate calculation of LGD; hence, LGD is derived on the unsecured portion and unrealized amount out of the secured portion.

In an aspect, other examples of external data attributes utilised can include, but are not limited to, GDP data, Bank rates, Stock market, stock market dynamics, pollution stats, water table, rainfall stats, repo & other bank rate changes, realizability of under lying securities, secured part of exposure, inflations data, war, demonetization, crude oil price dynamics, forex data, and other. In another aspect, Artificial Intelligence (AI) techniques such as Text Mining & Natural Language Processing (NLP) can be utilized for deriving additional variables that can be created out of the unstructured/textual data such as news, tweets, reviews, bank comments, sanction notes, etc. Such data can include event scores with date for news related to the customer/company, industry, backward/forward linked industries and/or industry sectors, backward/forward linked companies, raw materials consumed by parent industry of customer, products of parent industry, economy, govt. policy, natural calamities in related geographies, politics, review scores, any future activities, prominent events and the score of events found in bank comments and sanction notes. In another aspect, list of events can include changes in duties, production, revenue, profit, margin, ban on product/factory, calamities, and so on.

In another aspect, a roster of events along with its impact intensity with respect to different contexts (like raw material, product, geography, company/customer, etc.) can be maintained. Such identified attributes can contribute to the final score of the borrower that, in turn, reflects the probability of the borrower to default. Further, the D2D can also be determined.

In another embodiment, internal attributes and external attributes can be linked together into a single list of attributes and can be further processed in the step of variable conversion. Certain attributes from the single list of attributes that are in continuous manner or in categorical form can be converted in such a way that models can use them effectively. Such conversion of variables results in enhanced accuracy of models i.e. the models can make predictions of default with greater accuracy. For categorical variables, each category can be assigned a score according to default rate in history for the respective category, variable and sector. Each category or attribute can also be weighted based on importance and/or contribution of said category or attribute, onto the probability of loan default. For continuous variables, it is not necessary to have a direct and monotone relation with respect to default rate; such type of variables is converted in different groups and eventually assigned a score that is reflective of default rate in history for that respective group, variable and sector.

In another embodiment, such transformation can result in a better computation of information about default to the model. This step also keeps a check on structure of data supplied into the system, and whether it is in consonance with a required structure of data that the system is able to process.

In another embodiment, the attributes, along with their data, once structured in an expected format for the system, can be further refined by removing attributes without significant information about the default. In this process, the variables of higher significance, after studying historical data, can be retained within the system, while other attributes can be removed. The described process is referred to as insignificant data filtration.

Figure 5:
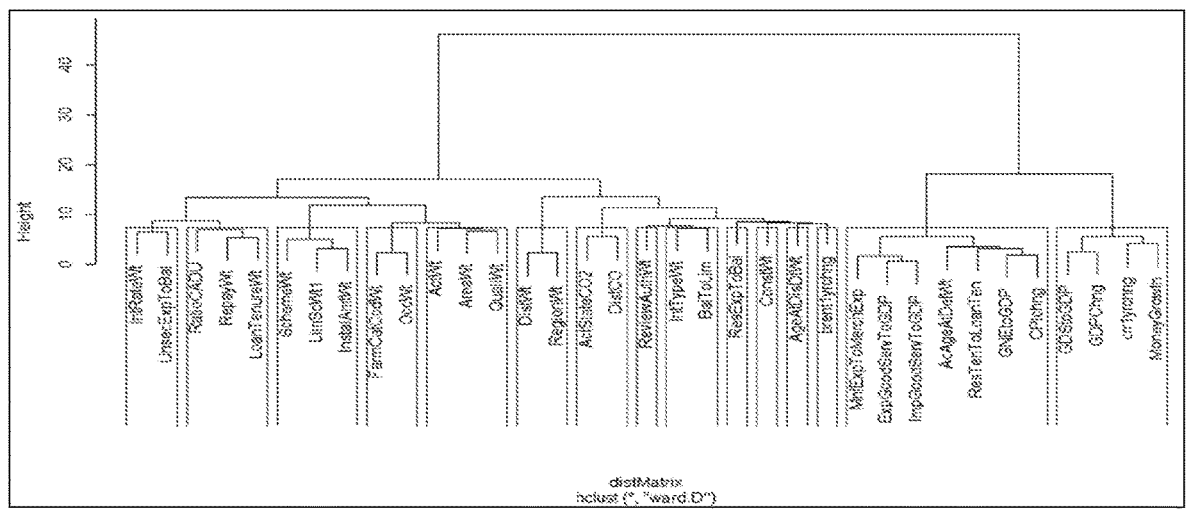
FIG. 5 illustrates an exemplary instance of clustering of data attributes, based on correlation of information.

FIG. 5 illustrates an exemplary instance of clustering of data attributes, based on correlation of information. In an embodiment, the significant attributes are tested for independence. Attributes that provide either same information or significantly identical information are clustered together, which allows the proposed system to perform clubbing and identification of the attributes that contribute the same information, wherein correlation between the attributes of the same cluster is high, while correlation between attributes of the different clusters is low. The above described process is referred to as hierarchical clustering.

In another embodiment, attributes within a cluster can be transformed into a new set of variables known as components, that are totally uncorrelated, by using appropriate methods (such as Principal Component Analysis (PCA)) from Multivariate Analysis. In an implementation, this new set of variables can be a linear combination of other variables from the same cluster and can be same in number of variables from the respective cluster. This process, also referred to as dimension reduction, can be carried out for all the clusters where the number of variables is more than one.

In another embodiment, the proposed method and system can construct a predictive model that is able to calculate expected outcome (PD or LGD) by using a given set of attributes for a borrower.

In another embodiment, the proposed method and system divides the entire data generated after dimension reduction step into a training data and a testing data, randomly, wherein the training data can be utilised in building the predictive model. A similar process is followed for both PD and LGD model building.

In another embodiment, during the model building process, stepwise variable selection process can be carried out in order to filter out variables that become redundant due to presence of other variables in the model at the respective step. In an exemplary instance, a criterion for selection of the variables can be $\alpha_{in}$ as 0.05 and $\alpha_{out}$ as 0.10. The process of stepwise variable selection allows the selection of a small subset of variables from a larger set that would result in a model that is simple and has good predictability. Predictive Model/ML algorithm would utilise testing data for calculating PD and LGD, and thus allow analysis and validation of predictability of the model.

In another embodiment, the proposed method and system can configure one or more inbuilt checks to ascertain if the attributes along with their data have been formatted in accordance with the requirement of the system so that data usage for generating a final prediction can be optimised. This checking carried out by the system is referred to as model validation. The residual diagnosis allows checking of regression assumptions (as & when applicable); homoscedasticity assumption, and to check the presence of influencing outliers. If the model is accepted through residual diagnosis it is back-tested with testing dataset, else any one or a combination of the following actions are taken:

Changing the number of clusters, redefine cluster memberships and repeat the process;

Adding more data and repeating the entire process;

Selecting raw data (by clubbing the data of different sectors) and repeating the entire process;

Splitting the data further (if data size is large) and repeating the entire process; and Changing the modelling technique, viz. using predictive model/machine learning (some examples can be Logistic Regression, Linear Regression, Random Forest, Neural Networks, Decision Tree, and other similar).

In another embodiment, in case the model data contains outlying observations, the model can be rebuilt removing said outlying observations.

In another embodiment, the proposed method and system checks if the significant attributes (independent variables used in the model) that have entered the model are co-related or not, wherein, if the variables are highly correlated, the system returns to the step of dimension reduction, and further enters into the step of stepwise variable selection, so as to avoid possible problems caused due to dependencies within attributes.

In another embodiment, a validation of the model is done by back-testing, which allows determination of predictive power of the fitted model. The testing data obtained during the step of data preparation is utilised and predictions of values from a fitted model are made, which are then compared to actual values by further calculating a false alarm & false positive rates for the model.

In another embodiment, it is also ensured that the fitted model is not overfitted. In case of overfitting, the model is rebuilt. This allows for judging if the predictive model is being biased towards noise or error.

In another embodiment, in case the model is valid, predictions are made on live data for PD and LGD.

Figure 6:
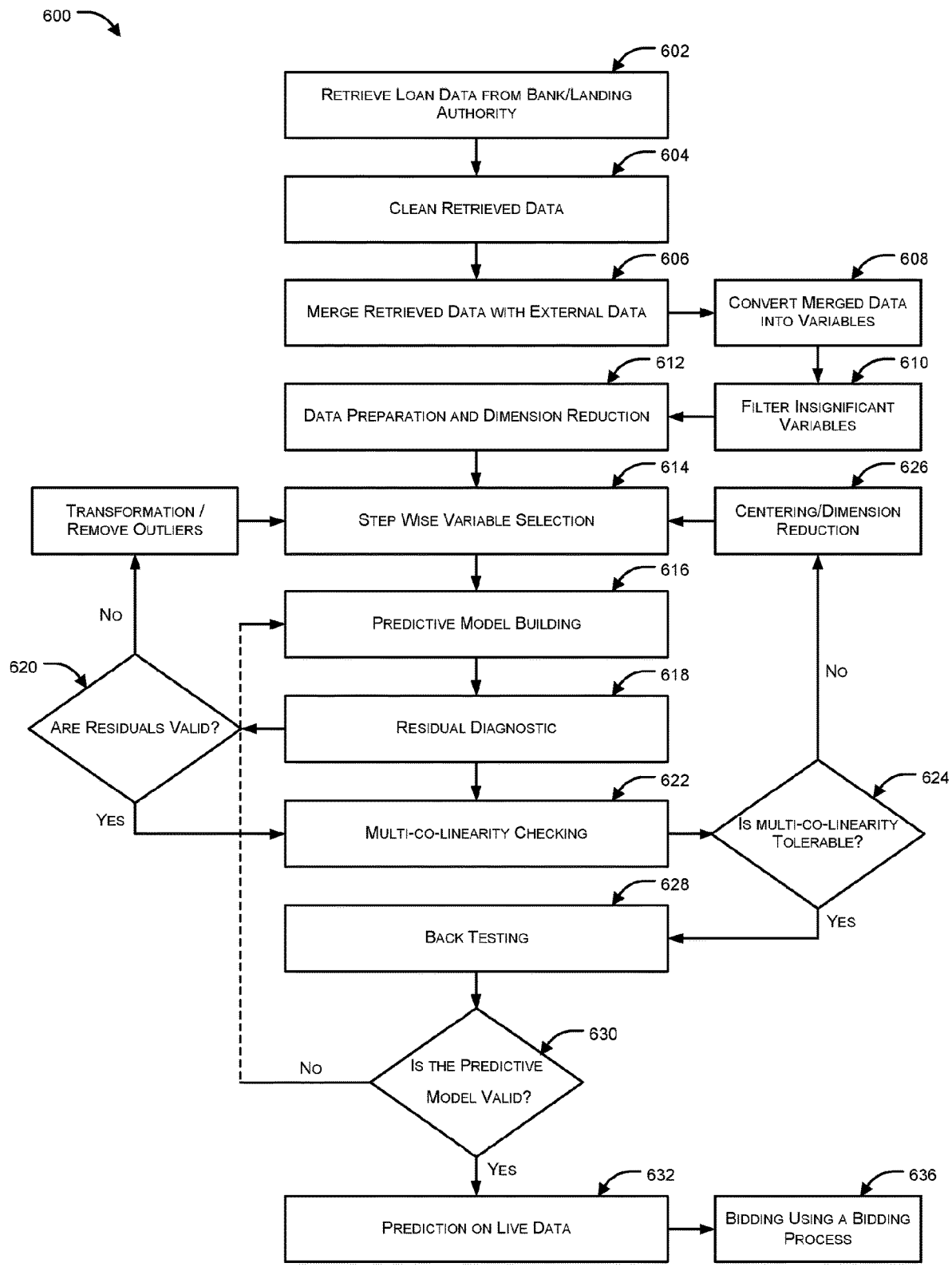
FIG. 6 illustrates an exemplary flow diagram for predicting PD and LGD from a predictive model.

FIG. 6 illustrates an exemplary flow diagram for predicting PD and LGD from a predictive model.

In an embodiment, in step 602, loan data pertaining to a borrower is retrieved from a lending entity, and at step 604, the retrieved data is cleaned.

In another embodiment, loan data can include internal subject data and is a combination of structured data elements and unstructured data elements, wherein the internal subject data can be bank data. The bank data can include, but not be limited to, customer details such as Constitution/Type, Area type, Occupation, Loan tenure, Loan age, Borrower Age at Disbursement, Residual exposure, CRM adjusted exposure, Total risk adjusted exposure obtained by STD approach, Borrower Industry/Sector, Scheme, Sanction limit, unsecured exposure.

In another embodiment, the attributes of an internal database can be utilized for building a predictive model for determining the PD. The internal subject data can include unstructured data elements and structured data elements, and hence, the subject data needs to be transformed into a data that can be processed by the default prediction system.

In an embodiment, the internal subject data is transformed by a step of data cleansing (604) of the default prediction system. The structured data and unstructured data are extracted and then converted to a form fit for the default prediction system. The step of data cleansing allows selection of internal attributes. Once the internal subject data has been cleansed, the internal attributes obtained are linked to external data attributes. The process of data cleansing can be carried out by automated algorithms.

In another embodiment, in step 606, the retrieved data is merged with external data so as to, at step 608, perform variable conversion by converting the merged data into variables. The external data attributes can include GDP data; Bank rates; Stock market; stock market dynamics, pollution stats, water table, rainfall stats, repo & other bank rate changes, inflations data, crude oil price dynamics, forex data, and other. Also, by using Text Mining & Natural Language Processing (NLP) techniques, some variables are derived & added in the prediction model. Variables are like natural calamities in customer geography, political change, war-prone situation to country, power breakdowns, demonetization, terror/other attacks & strikes in customer geography. On linking the internal attributes with the external data attributes, a step of variable conversion (608) is carried by the default prediction system. The step of variable conversion allows further refining of variables obtained using the step of data cleansing to be used by the system. This step allows increasing predictability of variables filtered to be used by the system. Some continuous variables do not have linear effect on the PD; such variables (like Age, Limit sanctioned, Instalment amount, Drawing Power and Appropriated Realized Value) are divided in groups and weights are assigned to each group on basis of proportion number of non-performing and written off accounts to the total number of accounts in the same group. Each group will have same number of observations though proportion of non-performing and written off accounts to the total number of accounts in the same grouping any pair of groups is significantly different. Groups with these characteristics can be formed using a CHAD tree.

In an exemplary instance, considering the variable 'age at default of borrower', wherein the step of variable conversion includes the step of converting categorical variables in to numeric W.H.E.*; Converting continuous scaled variables W.H.E.*; Calculating stock of indices; Mapping stock prices & indices data with customers; Mapping GDP data with customer's sector; Mapping backward & forward linkages of customer sector, linking news and social media data through its reflected sentiment and further converting them into numeric value reference data for its statistical modelling.

In another embodiment, in step 610, insignificant variables at filtered out, and at step 612, variable based data is prepared, and dimensions thereof are reduced. In another embodiment, variables converted can be further screened using a step of insignificant variable filtration (610). The step of insignificant variable filtration includes checking each variable for its significance and thus retaining significant variables only. The significant variables vary depending on sector and model. The insignificant variable filtration can be followed by a step of data preparation (612), which involves correlation analysis for independence and data clustering; dimension reduction; and data separation.

In another embodiment, in step 614, a variable selected one at a time undergoes predictive model building at step 616, and residual diagnostics at step 618. The step of data preparation and the process of dimension reduction are followed by a step of stepwise variable selection and predictive model building. In the process of stepwise variable selection and predictive model building, uncorrelated variables of the training data set obtained by the step of data separation are filtered. A criterion for selection of the uncorrelated variables is set for $\alpha_{in}$ at 0.05 and $\alpha_{out}$ at 0.10. The process of stepwise variable selection allows selection of a small subset of variables from a larger set, which would result in a model that is simple and has good predictability. The uncorrelated variables selected from the step of stepwise variable selection are further utilized in a step of predictive model building (616).

In an exemplary embodiment, the predictive model is built for the determination of PD and LGD. The predictive model for a PD is constructed using a decision tree, an artificial neural network, and a logistic regression model. The PD is a probability of slippage of a standard account within a span of one year.

In another embodiment, the predictive model for an LGD is constructed using a decision tree, a linear regression model. The LGD is an amount of loss a bank or a financial institution may suffer on default of a particular facility.

In another embodiment, the logistic regression model is utilised for determination of PD. The Logistic regression model is applied when variables used are categorical. In the logistic approach, the knowledge of a set of independent variables, is utilized for a probability of occurrence of an event (e.g. default), instead of a precise numerical value of a dependent variable. It models the relationship between a dependent variable and one or more independent variables and allows to check fit of the model as well as at the significance of the relationships (between dependent and independent variables) that is being modelled.

In another embodiment, the linear regression model is utilised for determination of LGD. The use of linear regression analysis allows determination of a relationship between a dependent variable and one or more independent variables (which are also called predictor or explanatory variables). Linear regression explores relationships that can be readily described by straight lines or their generalization to many dimensions.

In an exemplary embodiment, step of predictive model validation involves Multi co-linearity diagnosis; residual diagnosis; Adjusted R Square; and Durbin Watson Statistics. These are utilized to validate the predictive model obtained for determination of probability of default and loss given default by the process of predictive model building. The residual diagnosis (618) involves use of Histogram & Normal QQ; Plot of Standardized Residuals Residual Vs Fits Plot; Residual Vs Leverage Plot; Cooks Distance vs. Fit; and Scatter plot. The residual diagnosis allows checking of normality assumption; testing the assumption of homoscedasticity; and to check the presence on influencing outliers. If the residual diagnosis is valid, then the variables enter in to the back testing. If the residual diagnosis is not valid, then the variables are transformed, or outliers are removed, and the variables enter into the step of stepwise variable selection.

In another embodiment, in step 620, it is checked if residuals are valid, wherein if found not valid, the method enables transformation so as to remove outliers and the method, thereafter, goes back to step 614. On the other hand, if the residuals are valid, at step 622, multi co-linearity is checked between variables, wherein at step 624, it is evaluated if the multi co-linearity is tolerable. If multi co-linearity is not tolerable, cantering is performed to enable dimension reduction at step 626 and the method goes back to step 614. On the other hand, if the multi co-linearity is tolerable, back testing is performed at step 628. At step 630, it is checked if the predictive model is valid, wherein if not found valid, the flow goes back to step 616.

In another embodiment, if the predictive model is valid, in step 632, prediction is performed on live data and at step 634, PD is determined. The multi co-linearity diagnosis (622) allows determination of whether any two variables of the predictive model constructed are highly co-related. If the variables are highly correlated, the system returns to the step of dimension reduction and further enters the step of stepwise variable selection, for filtration of the variable to remove the highly correlated variables. The variables once filtered then enter the step of predictive model building and further into the predictive model validation.

In another embodiment, a step of back testing (628) is carried out after the process of model validation. The step of back testing is carried out to determine working of the predictive model constructed. Back testing utilizes the testing data obtained during the step of data separation. Back testing predicts values from a fitted model that is then compared to actual values and further, a percentage of right predicted default status is calculated. Back testing also includes a check for overfitting that determines whether the model is biased towards noise or error.

In another embodiment, if the result of the back testing is fitting the requirement, the predictive model is utilised to predict from live data entered into the system. If a result of the back testing is not fitting the requirement, the system will return to the step of data preparation.

Figure 7:
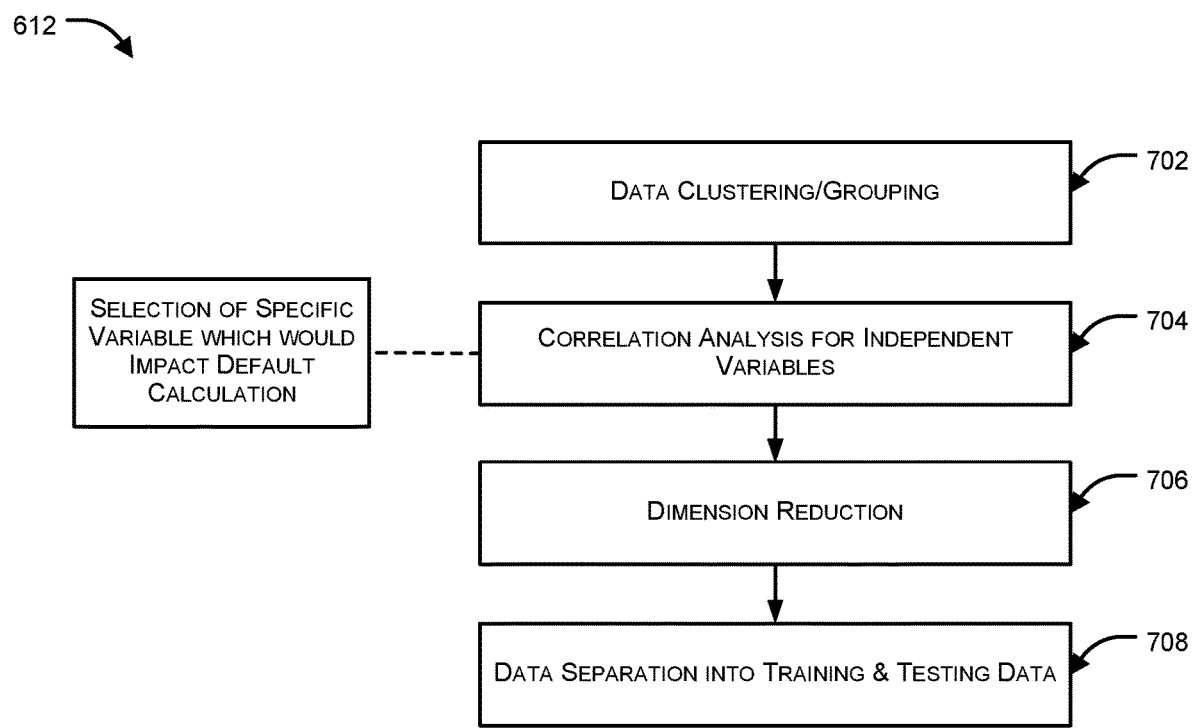
FIG. 7 illustrates the steps of data preparation and dimension reduction in greater detail.

FIG. 7 illustrates another flow diagram 712 showing how data preparation and dimension reduction is performed.

In another embodiment, in step 702, data is first clustered/grouped, post which, at step 704, selection of specific variable which would impact default calculation can be factored in for correlation analysis of independent variables. At step 706, dimension reduction is performed, post which, at step 708, data is separated into Training & Testing Data. As previously described, correlation analysis for independence and data clustering involves a hierarchical clustering (702). The hierarchical clustering involves clubbing significant variables obtained from the step of insignificant variable filtration in a cluster. A correlation (704) between the significant variable of same cluster is high while a correlation between a significant variable of different cluster is low.

In another embodiment, the dimensional reduction (706) involves a principal component analysis. The principal component analysis is a conversion of the significant variables into components, which are a set of uncorrelated variables that are utilised in building the predictive model. The process of data preparation and dimension reduction is utilised to reduce the significant variables to be used in the model and thereby, to improve the efficiency of said model. The data separation (708) involves separation of data i.e. the uncorrelated variables into a training data and a testing data. The training data is utilized in a process of predictive model building and the testing data is utilized in a process of predictive model validation.

In an embodiment, the resultant of the predictive model is an output that lies on a continuum between two states of a binary decision. In the current exemplary embodiment, the resultant can be used for determining the underlying risks in the selection of either of said decisions by analysing the variables influencing either decision.

In another embodiment, said resultant can be used to factor and arrive at an optimal utilisation of the critical input resource, where the quantification of the input resource varies as per the risk. The resultant can also be used to compare between the different independent variables which are influencing the outcome.

It can be appreciated by those skilled in the art that the embodiments of the disclosed invention described above can be applied to different problems that involve analysing the influence of a plurality of variables to arrive at an outcome towards a binary decision. Said problems can be across various industry domains and sectors such as but not limited to Aerospace, Defence, Telecommunications, Transport, Public and Civic services, Hospitality, Information Technology, Real Estate, Banking, Retail etc.

Figure 8:
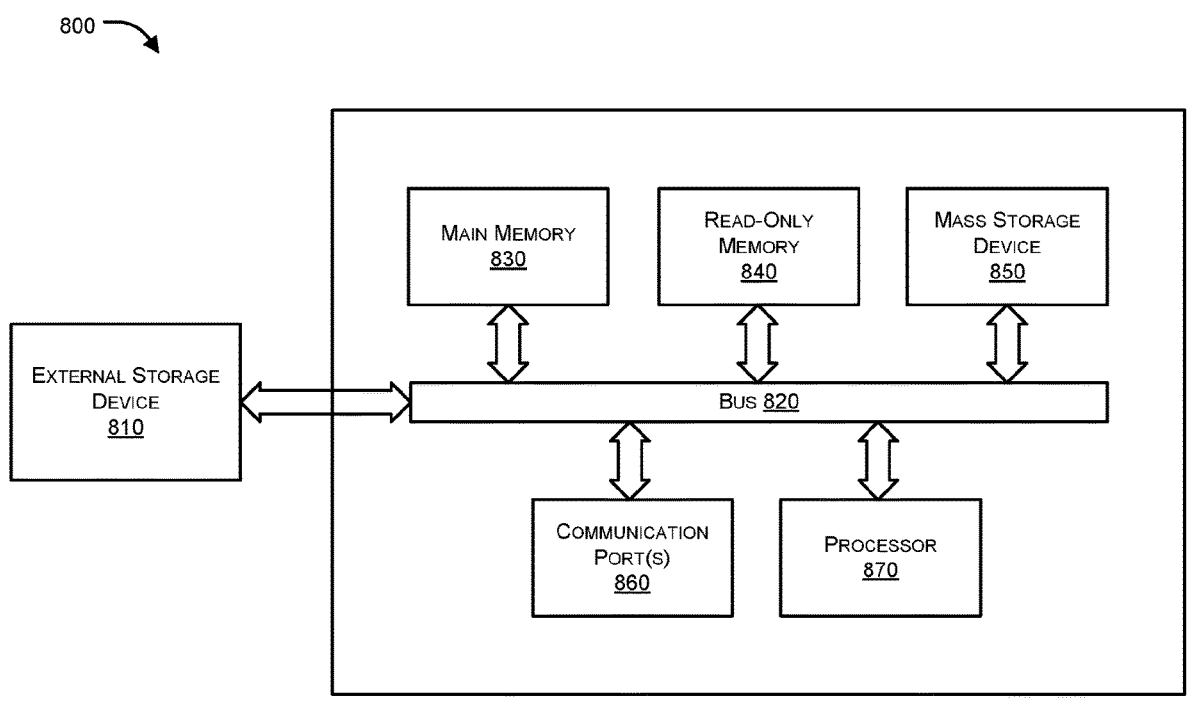
FIG. 8 illustrates an exemplary computer system in which or with which embodiments of the present invention can be utilized in accordance with embodiments of the present disclosure.

FIG. 8 illustrates an exemplary computer system in which or with which embodiments of the present invention can be utilized in accordance with embodiments of the present disclosure.

As shown in FIG. 8, computer system includes an external storage device 810, a bus 820, a main memory 830, a read only memory 840, a mass storage device 850, communication port 860, and a processor 870. A person skilled in the art will appreciate that computer system may include more than one processor and communication ports. Examples of processor 870 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 870 may include various modules associated with embodiments of the present invention. Communication port 860 can be any of an RS-232 port for use with a modem-based dialup connection, a 10/100 Ethernet port, a Gigabit or 10 Gigabit port using copper or fibre, a serial port, a parallel port, or other existing or future ports. Communication port 860 may be chosen depending on a network, such a Local Area Network (LAN), Wide Area Network (WAN), or any network to which computer system connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g., start-up or BIOS instructions for processor 870. Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with computer system. Other operator and administrative interfaces can be provided through network connections connected through communication port 860. External storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

As used herein, and unless the context dictates otherwise, the term "coupled to" is intended to include both direct coupling; in which two elements that are coupled to each other contact each other, and indirect coupling; in which at least one additional element is located between the two elements. Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While various embodiments of the present disclosure have been illustrated and described herein, it will be clear that the disclosure is not limited to these embodiments only. Numerous modifications, changes, variations, substitutions, and equivalents will be apparent to those skilled in the art, without departing from the spirit and scope of the disclosure, as described in the claims.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure provides a method and system for exchanging packets of information pertaining to an instrument.

The present disclosure provides a predictive model capable of predicting one or more packets that can influence the exchange of packets pertaining to the instrument.

The present disclosure provides a predictive model from data acquired from internal and external sources, both governmental and non-governmental.

The present disclosure provides a method and system where modelling is simplified by overcoming problems occurring due to correlation in the independent set of variables.

The present disclosure provides a predictive model that is built after the data attributes have been optimised.

I claim:

1. A method for predicting a probability of an occurrence of an event pertaining to an instrument, said method comprising steps of:

retrieving, by a processor, instrument transaction data and any or a combination of one or more external and internal data attributes from a networked repository, and converting said data and data attributes into a plurality of variables by linking the internal data attributes with the external data attributes;

filtering, by the processor, one or more variables among the plurality of variables to get the one or more filtered variables containing information about default, wherein the filtering is performed based on similarity of information contained in attributes of the plurality of variables;

generating, by the processor, clusters of the filtered variables based on correlation amongst them, and clubbing the filtered variables based on the correlation;

transforming, by the processor, the variables from each cluster into variables, called components, to reduce dimensions of the generated clusters;

upon the reduction of the dimensions of the generated clusters, performing, by the processor, a stepwise variable selection by removing highly correlated variables among the components to generate uncorrelated variables or independent variables; and predicting, by the processor, a probability of the occurrence of the event pertaining to the instrument, wherein said predictions are performed based on the uncorrelated variables, wherein the uncorrelated variables are formed before the step of predicting.

2. The method as claimed in claim 1, wherein the external data attributes can be obtained from external governmental and non-governmental sources in a structured and unstructured way.

3. The method as claimed in claim 1, wherein a back-testing process is carried out to verify the predictive capability and estimation of miss-classifications, by utilising sample data.

4. A system for predicting a probability of an occurrence of an event pertaining to an instrument, said system comprising:

a non-transitory storage device having embodied therein one or more routines operable to exchange packets in relation with the instrument; and one or more processors coupled to the non-transitory storage device and operable to execute the one or more routines, wherein the one or more routines when executed cause the one to more processors to:

retrieve instrument transaction data and any or a combination of one or more external and internal data attributes from a networked repository, and converting said data and data attributes into a plurality of variables by linking the internal data attributes with the external data attributes;

filter one or more variables among the plurality of variables to get the one or more filtered variables containing information about default, wherein the filtering is performed based on similarity of information contained in attributes of the plurality of variables;

generate clusters of the filtered variables based on correlation amongst them, and clubbing the filtered variables based on the correlation;

transform the variables from each cluster into variables, called components, to reduce dimensions of the generated clusters;

upon the reduction of the dimensions of the generated clusters, perform a stepwise variable selection by removing highly correlated variables among the components to generate uncorrelated variables; and predict a probability of the occurrence of the event pertaining to an instrument, wherein said predictions are performed based on the uncorrelated variables, wherein the uncorrelated variables are formed before the step of predicting.

5. The system as claimed in claim 4, wherein the external data attributes can be obtained from one or more networked databanks, configured to receive and store information from external sources.

* * * * *